E. E. HAUER.
TURBINE.
APPLICATION FILED JAN. 28, 1909.

951,115.

Patented Mar. 8, 1910.

Witnesses

Inventor
Elmer E. Hauer
By Oercy Norton
Attorney

UNITED STATES PATENT OFFICE.

ELMER E. HAUER, OF SPRINGFIELD, OHIO, ASSIGNOR TO THE LAGONDA MANUFACTURING COMPANY, OF SPRINGFIELD, OHIO, A CORPORATION OF OHIO.

TURBINE.

951,115.  Specification of Letters Patent.  Patented Mar. 8, 1910.

Application filed January 28, 1909. Serial No. 474,866.

*To all whom it may concern:*

Be it known that I, ELMER E. HAUER, a citizen of the United States, residing at Springfield, in the county of Clark and State of Ohio, have invented certain new and useful Improvements in Turbines, of which the following is a specification, reference being had therein to the accompanying drawings.

My invention relates to turbines for driving tube cleaners and more particularly to a turbine that is carried through the tube with the cleaner although it may be used for other purposes.

The object of my invention is to provide a simple, efficient and compact turbine having a strong, durable bearing to withstand the shocks and jars incident to its use.

With these and other objects in view my invention consists of the constructions and combinations hereinafter described and set forth in the claims.

Figure 1:
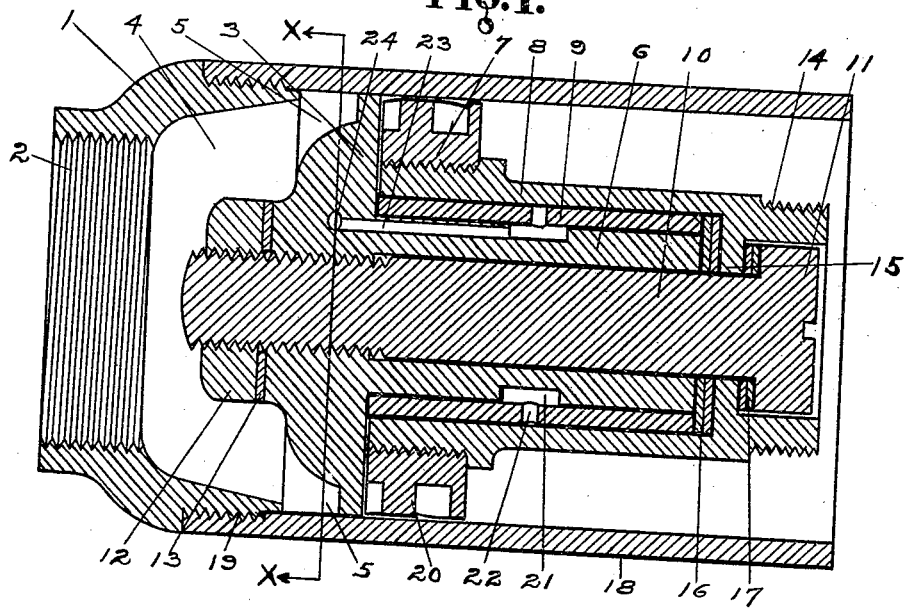
Figure 2:
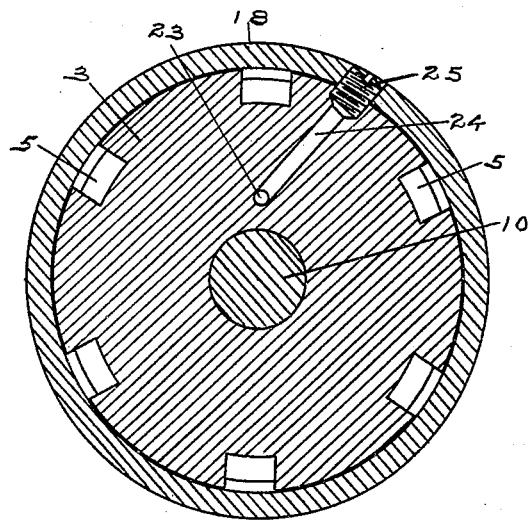

In the accompanying drawings Figure 1 is a longitudinal section of a turbine embodying my invention and Fig. 2 is a cross section of the same on the line XX of Fig. 1.

Like numerals represent the same parts in the two views.

In the drawings 1 represents a supply head having a screw threaded inlet 2, to which the supply hose can be attached. Said head has a front wall 3, forming a supply chamber 4 having ports 5 opening through said wall; and said head is further provided with a cylindrical portion 6, preferably formed integrally therewith, projecting forwardly from said wall. A runner 7 having a forwardly projecting cylindrical portion 8 is journaled on the cylindrical portion 6 of the head, a bushing 9 being preferably employed to form a bearing therefor. It will be seen the construction is such as to provide a bearing of great relative length and the bearing support being formed integrally with the head it gives a rigid, strong, durable structure that will not wear loose under the shocks and jars incident to the use of the turbine.

A bolt 10 having a head 11, extends through the supply head 1 and its cylindrical portion 6, said bolt being screw threaded into said head and further provided with a nut 12 and a lock washer 13, to rigidly secure the same in said head. The forward end of the cylindrical portion 8 of the runner 7 is reduced and screw threaded at 14 to attach the cleaner or tool to be driven; and said cylindrical portion 8 is further provided with an inwardly extending annular rib or web 15 interposed between the bolt head 11 and the forward end of the cylindrical portion 6 of the supply head, to form a thrust bearing to take the end thrust in both directions, hardened plates 16 and 17 being preferably employed to take the wear.

A casing 18 screw threaded at 19 to a reduced portion of the supply head, forms the outer walls of the supply ports 5, confines the motive fluid to its passage through the buckets 20 of the runner and extends forwardly slightly beyond the cylindrical portion of the runner to protect the same and permit the advancement of the turbine in a tube as fast only as the scale is removed from the walls of the tube.

An annular recess 21 formed in the cylindrical portion 6 of the supply head abuts on the bushing 9 and forms a lubricant chamber having radial openings 22 through the bushing; and the lubricant is supplied thereto through a longitudinally projecting supply conduit 23 intercepted by an inclined inlet 24 opening through the casing 18 and the wall 3 of the supply head between two of the ports 5 thereof, said inlet being provided with a screw plug 25 to retain the lubricant.

Having thus described my invention, I claim:

1. In a turbine the combination of a supply head having a chamber with a wall in front of said chamber having ports therethrough and a central forwardly projecting cylinder, said wall and cylinder being formed integrally with said head and a runner having a forwardly projecting cylinder journaled on the projecting cylinder of the head, substantially as described.

2. In a turbine the combination of a supply head having a chamber with a wall in front of said chamber having ports therethrough and a central forwardly projecting cylinder, said wall and cylinder being formed integrally with said head and a runner having a forwardly projecting cylinder with a removable bushing therein journaled on the projecting cylinder of the head, substantially as described.

3. In a turbine the combination of a supply head having a chamber with a wall in front of said chamber having ports therethrough and a central forwardly projecting cylinder, said wall and cylinder being formed integrally with said head and a runner having a hub with a forwardly projecting cylinder formed integrally with said hub and journaled on the cylinder of the head, substantially as described.

4. In a turbine the combination of a supply head having a chamber with a wall in front of said chamber, having ports therethrough and a central forwardly projecting cylinder, said wall and cylinder being formed integrally with said head, and a runner having a hub with a forwardly projecting cylinder formed integrally with said hub, with a removable bushing therein journaled on the cylinder of the head, substantially as described.

5. In a turbine the combination of a supply head having a chamber with a wall in front of said chamber having ports therethrough and a central forwardly projecting cylinder, said wall and cylinder being formed integrally with said head, a runner having a forwardly projecting cylinder journaled on the projecting cylinder of the head, means to maintain its position thereon, said means forming a thrust bearing for the runner, substantially as described.

6. In a turbine the combination of a supply head having a chamber with a wall in front of said chamber having ports therethrough and a central forwardly projecting cylinder, said wall and cylinder being formed integrally with said head, a runner having a hub with a forwardly projecting cylinder formed integrally with said hub with a removable bushing therein journaled on the cylinder of the head, means to maintain its position thereon, said means forming a thrust bearing for the runner, substantially as described.

7. In a turbine the combination of a supply head having a forwardly projecting cylindrical portion formed integrally therewith, a runner having a forwardly projecting cylindrical portion journaled on the projecting cylinder of the head, a bolt secured to said head and adapted to engage said runner to maintain the position of said runner on its bearing and to form a thrust bearing therefor, substantially as described.

8. In a turbine the combination of a supply head having a forwardly projecting cylindrical portion formed integrally therewith, a runner having a forwardly projecting cylindrical portion journaled on the projecting cylindrical portion of the head, a bolt secured to the supply head, said bolt having a shoulder thereon, a rib formed on the cylindrical portion of the runner interposed between the cylindrical portion of the supply head and the shoulder of said bolt to form a bearing to take the end thrust in both directions, substantially as described.

9. In a turbine the combination of a runner having a forwardly projecting cylindrical portion, a supply head having a chamber therein with ports through the front wall thereof opening to said runner, a cylindrical portion formed integrally with said head and projecting forwardly from said front wall, on which said runner and its projecting cylinder is journaled, a bolt secured to said front wall of the supply head and extending through the projecting cylinder of said head and having a shoulder thereon, a rib formed on the cylindrical portion of the runner interposed between the cylindrical portion of the supply head and said bolt shoulder to form a bearing to take the end thrust in both directions, and a casing secured to said supply head, substantially as described.

10. In a turbine the combination of a supply head having a transverse wall with ports formed from the outside thereof and a central cylindrical portion projecting forwardly from said wall and formed integrally therewith, a casing secured to said head forming the outer wall of said ports, a runner with a forwardly projecting cylindrical portion of less diameter than the runner, journaled on the projecting cylinder of the head, means to maintain its position thereon, said means forming a thrust bearing for the runner, substantially as described.

11. In a turbine the combination of a supply head having a transverse wall with ports formed from the outside thereof and a central cylindrical portion projecting forwardly from said wall and formed integrally therewith, a runner having buckets on its periphery and a central forwardly projecting cylindrical portion of less diameter, journaled on the projecting cylinder of the head, a casing secured to the head forming the outer walls of said ports and confining the motive fluid in its passage through the runner buckets, said casing extending beyond the projecting cylinder of the runner, substantially as described.

In testimony whereof, I hereunto affix my signature in the presence of two witnesses.

ELMER E. HAUER.

Witnesses:
GROVER ILGEN,
CARL CASKEY.